(12) United States Patent
Bigelow et al.

(10) Patent No.: US 9,809,483 B2
(45) Date of Patent: Nov. 7, 2017

(54) APPARATUS AND METHOD FOR MAKING AND SEPARATING A FLEXIBLE RIBBON CONFIGURATION

(71) Applicant: Corning Incorporated, Corning, NY (US)

(72) Inventors: Donald Orrin Bigelow, Honeoye Falls, NY (US); Daniel Patrick Gormel, Livonia, NY (US); Richard Jonathan Kohler, Hilton, NY (US)

(73) Assignee: Corning Incorporated, Corning, NY (US)

(*) Notice: Subject to any disclaimer, the term of this patent is extended or adjusted under 35 U.S.C. 154(b) by 118 days.

(21) Appl. No.: 14/430,038

(22) PCT Filed: Sep. 26, 2013

(86) PCT No.: PCT/US2013/061866
§ 371 (c)(1),
(2) Date: Mar. 20, 2015

(87) PCT Pub. No.: WO2014/052554
PCT Pub. Date: Apr. 3, 2014

(65) Prior Publication Data
US 2015/0232370 A1    Aug. 20, 2015

Related U.S. Application Data

(60) Provisional application No. 61/705,788, filed on Sep. 26, 2012.

(51) Int. Cl.
*C03B 33/023* (2006.01)

(52) U.S. Cl.
CPC ....... *C03B 33/0235* (2013.01); *Y10T 428/192* (2015.01)

(58) Field of Classification Search
CPC .................. C03B 33/0235; Y10T 428/192
See application file for complete search history.

(56) References Cited

U.S. PATENT DOCUMENTS 4,562,102 A * 12/1985 Rabuse ............... C09J 7/02
156/90
6,325,324 B1 * 12/2001 Getz ................. B65H 19/1852
242/555.2
(Continued)

FOREIGN PATENT DOCUMENTS

JP       2-48845 Y2    12/1990
JP       2011219338 A  11/2011
(Continued)

OTHER PUBLICATIONS

CN201380050330.5 First Office Action dated Nov. 15, 2016, China Patent Office.
(Continued)

*Primary Examiner* — Sang Kim
(74) *Attorney, Agent, or Firm* — Jeffrey A. Schmidt

(57) ABSTRACT

A flexible ribbon configuration includes a flexible glass ribbon including a leading end and a trailing end. In one example, the flexible ribbon configuration includes at least one ribbon extension extending between a first end and an opposing second end. In another example, the first end of the ribbon extension is attached to at least one of the trailing end and the leading end of the flexible glass ribbon. In yet another example, the at least one ribbon extension defines an elongated opening between the first end of the ribbon extension and the second end of the ribbon extension. Further examples include a method of making a flexible ribbon configuration. Still further examples include a method of separating a flexible ribbon configuration.

2 Claims, 10 Drawing Sheets

(56) References Cited

U.S. PATENT DOCUMENTS

| | | |
|---|---|---|
| 7,350,739 B2 | 4/2008 | Maddaleni et al. |
| 9,028,940 B2 | 5/2015 | Hasegawa et al. |
| 2006/0083894 A1 | 4/2006 | Vetrovec et al. |
| 2011/0200812 A1 | 8/2011 | Tomamoto et al. .......... 428/220 |
| 2012/0017642 A1 | 1/2012 | Teranishi et al. ............... 65/105 |
| 2013/0236675 A1 | 9/2013 | Garner et al. .................. 428/54 |
| 2015/0251873 A1 | 9/2015 | Garner et al. |

FOREIGN PATENT DOCUMENTS

| | | |
|---|---|---|
| WO | 2006/121709 A1 | 11/2006 |
| WO | 2008/108338 A | 3/2008 |
| WO | 2011/150149 A1 | 12/2011 |
| WO | 2012/017988 A1 | 2/2012 |
| WO | 2012090693 A1 | 7/2012 |
| WO | 2014085357 A1 | 6/2014 |

OTHER PUBLICATIONS

EP13843012 Supplementary European Search Report dated Aug. 18, 2016.

International Search Report and Written Opinion PCT/US2013/061866 dated Dec. 18, 2013.

Taiwan Patent Application No. 102134788 Search Report dated Apr. 18, 2017; 1 Page; Taiwan Patent Office.

English Translation of JP2015533310 Office Action dated Jul. 25, 2017, Japan Patent Office.

\* cited by examiner

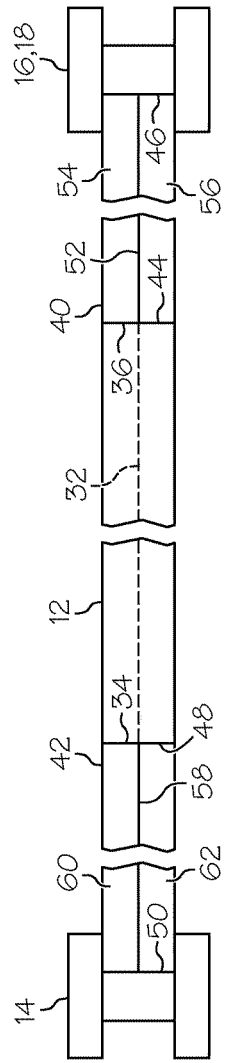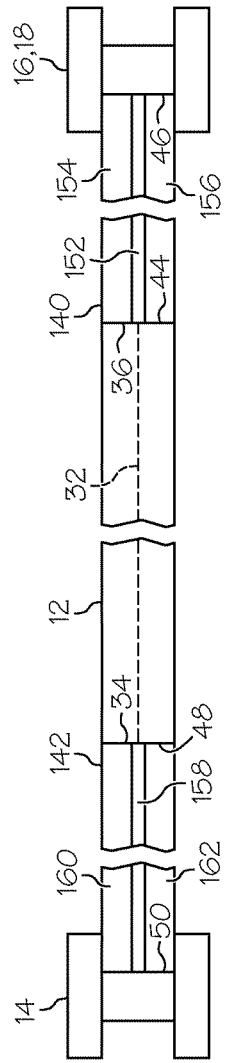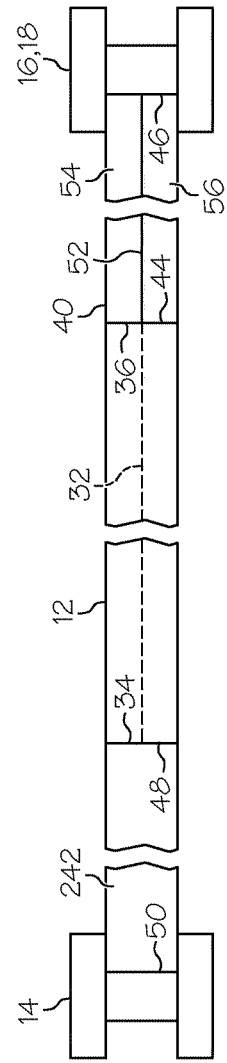

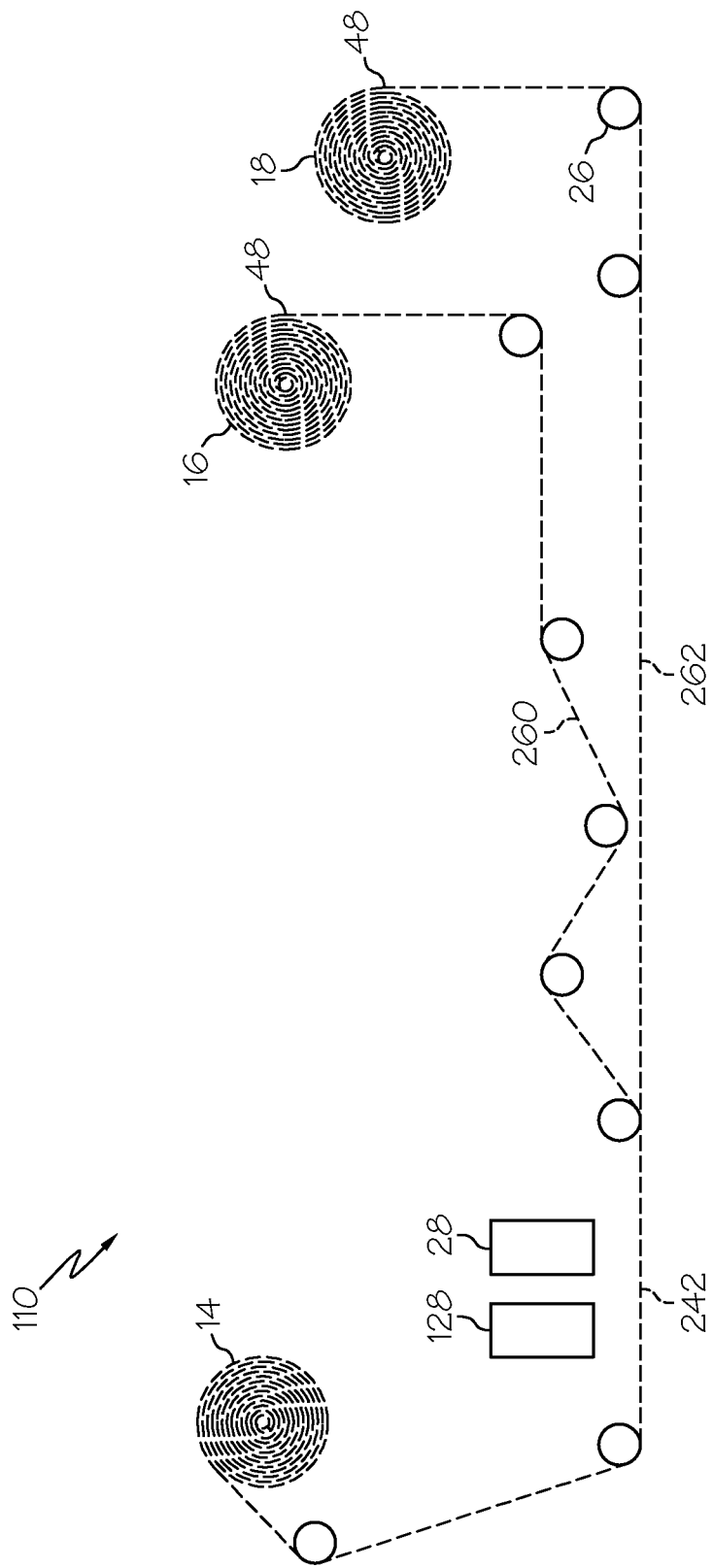

APPARATUS AND METHOD FOR MAKING AND SEPARATING A FLEXIBLE RIBBON CONFIGURATION

This application claims the benefit of priority under 35 U.S.C. §371 of International Patent Application Serial No. PCT/US13/61866, filed on Sep. 26, 2013 designating the United States of America, which claims the benefit of priority under 35 U.S.C. §119 of U.S. Provisional Application Ser. No. 61/705,788, filed on Sep. 26, 2012, the content of which is relied upon and incorporated herein by reference in its entirety.

TECHNICAL FIELD

The invention relates to apparatus and methods for making and separating glass and, more particularly, to making and separating flexible glass.

BACKGROUND

It is generally known to provide leaders and trailers during glass manufacturing. For example, it is known to provide leaders and trailers to leading and/or trailing edges of a glass film during glass manufacturing.

SUMMARY

The following presents a simplified summary of the disclosure in order to provide a basic understanding of some example aspects described in the detailed description.

In a first example aspect, a flexible ribbon configuration is provided. The flexible ribbon configuration comprises a flexible glass ribbon including a leading end and a trailing end. The flexible ribbon configuration further comprises at least one ribbon extension extending between a first end and an opposing second end. The first end of the ribbon extension is attached to at least one of the trailing end and the leading end of the flexible glass ribbon. The at least one ribbon extension defines an elongated opening between the first end of the ribbon extension and the second end of the ribbon extension.

In one example of the first aspect, the at least one ribbon extension includes a leading ribbon extension and a trailing ribbon extension. The first end of the leading ribbon extension is attached to the leading end of the flexible glass ribbon and the first end of the trailing ribbon extension is attached to the trailing end of the flexible glass ribbon.

In another example of the first aspect, the second end of the trailing ribbon extension is attached to an upstream storage roll.

In still another example of the first aspect, the second end of the leading ribbon extension is attached to a downstream storage roll.

In a further example of the first aspect, the elongated opening in the ribbon extension extends at least partially along a length of the ribbon extension between the first end and the second end of the ribbon extension.

In another example of the first aspect, the at least one ribbon extension includes two ribbon extensions separated from one another by the elongated opening.

The various examples of the first aspect may be used in any and all combinations with one another.

In a second example aspect, a method of making a flexible ribbon configuration is provided. The method comprises the step of (I) providing a flexible glass ribbon including a leading end and a trailing end. The method also includes the step (II) of attaching a first end of at least one ribbon extension to at least one of the leading end and the trailing end of the flexible glass ribbon such that the at least one ribbon extension defines an elongated opening extending between the first end of the ribbon extension and an opposing second end of the ribbon extension.

In one example of the second aspect, the at least one ribbon extension includes a leading ribbon extension and a trailing ribbon extension, such that step (II) includes attaching the first end of the leading ribbon extension to the leading end of the flexible glass ribbon and attaching the first end of the trailing ribbon extension to the trailing end of the flexible glass ribbon.

In another example of the second aspect, the method further comprises the step of attaching the second end of the trailing ribbon extension to an upstream storage roll.

In another example of the second aspect, the method further comprises the step of attaching the second end of the leading ribbon extension to a downstream storage roll.

In yet another example of the second aspect, the elongated opening in the ribbon extension is provided to extend at least partially along a length of the ribbon extension between the first end and the second end of the ribbon extension.

In another example of the second aspect, the at least one ribbon extension includes two ribbon extensions and wherein step (II) attaches the two ribbon extensions relative to one another to define the elongated opening between the two ribbon extensions.

The various examples of the second aspect may be used in any and all combinations with one another.

In a third example aspect, a method of separating a flexible ribbon configuration is provided. The method comprises the step of (I) providing a flexible glass ribbon including a leading end and a trailing end with a first end of at least one ribbon extension attached to at least one of the leading end and the trailing end of the flexible glass ribbon. The method also includes the step (II) of providing the at least one ribbon extension with an elongated opening extending in a direction along a separation path. The method further includes the step (III) of cutting the flexible glass ribbon at a cutting location along the separation path to provide a first separated glass ribbon portion provided with a first ribbon extension of the at least one ribbon extension and a second separated glass ribbon portion provided with a second ribbon extension of the at least one ribbon extension.

In an example of the third aspect, the method further comprises the step of maintaining a tension in a portion of the flexible glass ribbon with the ribbon extension while moving the flexible glass ribbon relative to the cutting location.

In another example of the third aspect, step (III) begins prior to completing step (II).

In yet another example of the third aspect, the method further comprises the step of unwinding the flexible glass ribbon from an upstream storage roll during step (III).

In another example of the third aspect, step (III) includes continuing to cut the flexible glass ribbon after the trailing end of the flexible glass ribbon leaves the upstream storage roll, such that a length of the ribbon extension spans a distance along a travel path between the upstream storage roll and the cutting location.

In another example of the third aspect, the method further comprises the step of completing step (III) while the ribbon extension maintains a tension in the flexible glass ribbon.

In yet another example of the third aspect, the method further comprises the step of winding the first separated glass ribbon portion on a first downstream storage roll and winding the second separated glass ribbon portion on a second downstream storage roll.

In another example of the third aspect, step (I) provides the at least one ribbon extension as two ribbon extensions spaced apart from one another to provide the elongated opening of step (II).

The various examples of the third aspect may be used in any and all combinations with one another.

BRIEF DESCRIPTION OF THE DRAWINGS

These and other aspects are better understood when the following detailed description is read with reference to the accompanying drawings, in which:

FIG. 2 is a plan view of a flexible glass ribbon including ribbon extensions for use in the flexible ribbon configuration;

FIG. 3 is a plan view of a second example flexible glass ribbon including ribbon extensions for use in the flexible ribbon configuration;

FIG. 4 is a plan view of a third example flexible glass ribbon including ribbon extensions for use in the flexible ribbon configuration;

FIG. 12 is a perspective view of the second example flexible ribbon configuration with the flexible glass ribbon wound onto at least one downstream storage roll.

DETAILED DESCRIPTION

Figure 1:
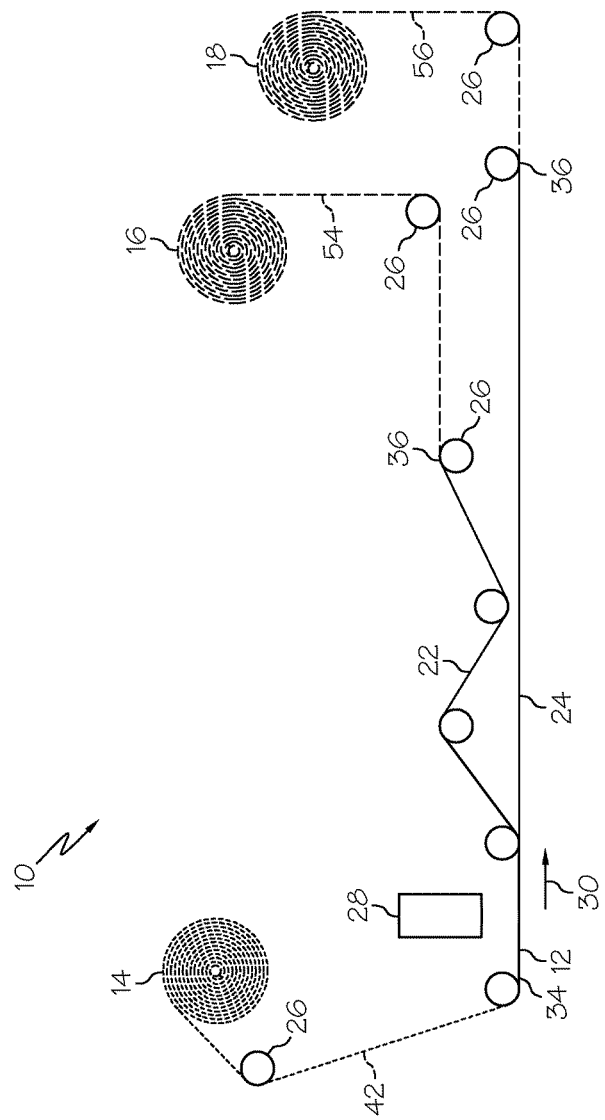
FIG. 1 is a perspective view of an example flexible ribbon configuration in accordance with one aspect of the disclosure.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

FIG. 1 illustrates a perspective view of a flexible ribbon configuration 10 incorporating example aspects of the disclosure. In one example, the flexible ribbon configuration 10 includes a flexible glass ribbon 12 that can be incorporated in roll to roll processing. The flexible glass ribbon 12 may be cut, scored, etc. for use in a wide variety of applications. For example, the flexible glass ribbon 12 may be subsequently used in organic light-emitting diode (OLED) displays, photovoltaic (PV) applications, touch sensors, color-filter, TFT backplanes, or the like. The flexible glass ribbon 12 can include a wide range of dimensions (e.g., length, width, thickness, etc.). In one example, the flexible glass ribbon 12 can have a thickness of less than approximately 0.3 millimeters, for example, 0.3, 0.25, 0.2, 0.15. 0.1, 0.075, 0.05, 0.025, 0.01 mm. As such, the flexible glass ribbon 12 shown in FIG. 1 includes a variety of sizes and shapes.

The flexible ribbon configuration 10 can include at least one storage roll. In one example, the at least one storage roll includes a single storage roll (e.g., an upstream storage roll 14 or one of a first or second downstream storage roll 16, 18). In further examples, the at least one storage roll includes the upstream storage roll 14 and at least one of the first and second downstream storage rolls 16, 18. The flexible glass ribbon 12 can extend between the upstream storage roll 14 and the first and second downstream storage rolls 16, 18. In one example, the upstream storage roll 14 can store a length of the flexible glass ribbon 12. The flexible glass ribbon 12 can be unwound from the upstream storage roll 14 and can be cut at a location between the upstream storage roll 14 and the at least one first and second downstream storage rolls 16, 18.

The flexible glass ribbon 12 can be cut in a lengthwise direction along which the flexible glass ribbon 12 extends, such that the flexible glass ribbon 12 is separated to form a first separated glass ribbon portion 22 and a second separated glass ribbon portion 24. The first separated glass ribbon portion 22 can be wound onto the first downstream storage roll 16. Similarly, the second separated glass ribbon portion 24 can be wound onto the second downstream storage roll 18. The downstream storage rolls are not limited to including the first downstream storage roll 16 and second downstream storage roll 18. Rather, in further examples, the downstream storage rolls could include any number of downstream storage rolls (i.e., one or more downstream storage rolls). For instance, the downstream storage rolls could include first, second, and third downstream storage rolls. In such an example, the flexible glass ribbon 12 could be cut into a plurality of separated glass ribbon portions (e.g., three separated glass ribbon portions), such that the first separated glass ribbon portion 22 is wound onto the first downstream storage roll 16, the second separated glass ribbon portion 24 is wound onto the second downstream storage roll 18, and a third separated glass ribbon portion is wound onto a third downstream storage roll. Indeed, any number of downstream storage rolls and separated glass ribbon portions are envisioned.

The flexible ribbon configuration 10 includes a cutting location 28. The cutting location 28 is somewhat generically/schematically depicted as the cutting location 28 can include a number of different structures that can cut (e.g., separate, score, etc.) the flexible glass ribbon 12 into the first separated glass ribbon portion 22 and the second separated glass ribbon portion 24. The cutting location 28 can include, for example, laser cutting devices, mechanical cutting devices, a combination of both, etc. Further, the cutting location 28 is not limited to including a single cutting device, and may include a plurality of cutting devices for cutting and separating the flexible glass ribbon 12.

The cutting location 28 can be provided at a location along a travel path 30 of the flexible glass ribbon 12 between the upstream storage roll 14 and the downstream storage rolls 16, 18. In one example, the cutting location 28 can be positioned closer in proximity along the travel path 30 to the upstream storage roll 14 than the downstream storage rolls 16, 18. However, in other examples, the cutting location 28 could be positioned at nearly any location along the travel path 30 (e.g., closer to the upstream storage roll 14, closer to one of the downstream storage rolls 16, 18, etc.).

The flexible ribbon configuration 10 can further include one or more rollers 26. The rollers 26 can assist in stabilizing and maintaining a desired tension in the flexible glass ribbon 12 as the flexible glass ribbon 12 moves along the travel path 30. While a total of nine rollers are shown in FIG. 1, in further examples, any number of rollers 26 could be provided. The rollers 26 can engage a portion of the flexible glass ribbon 12 as the flexible glass ribbon 12 moves along the travel path 30. In some examples, the rollers 26 can redirect the direction along which the flexible glass ribbon 12 moves. The rollers 26 can include any number of sizes, shapes, and configurations. For example, the rollers 26 can each define a substantially smooth outer surface, grooved outer surface, or other surface configurations. In other examples, the rollers 26 could include one or more coatings or the like and/or may include drive motors for rotating the rollers 26.

Turning now to FIG. 2, the flexible glass ribbon 12 is shown. The flexible glass ribbon 12 is depicted in FIG. 2 without the rollers 26, cutting location 28, etc. for illustrative purposes and to more clearly depict portions of the flexible glass ribbon 12. However, in operation, the flexible ribbon configuration 10 can include the rollers 26, cutting location 28, etc. in a similar manner as described with respect to FIG. 1.

The flexible glass ribbon 12 extends between a leading end 36 and a trailing end 34. The leading end 36 defines a front end of the flexible glass ribbon 12 as the flexible glass ribbon 12 travels in a direction along the travel path 30 towards the downstream storage rolls 16, 18. The trailing end 34 defines a rear end of the flexible glass ribbon 12 as the flexible glass ribbon 12 travels along the travel path 30.

The flexible glass ribbon 12 can be cut by the cutting location 28 along a separation path 32. The separation path 32 is depicted as a dashed line for illustrative purposes. Further, while the separation path 32 is shown as being positioned at substantially a center location of the flexible glass ribbon 12, the separation path 32 is not limited to such a location. In further examples, the separation path 32 could be offset from the center of the flexible glass ribbon 12, for example by being positioned closer to one of the edges of the flexible glass ribbon 12 (i.e., for removing edges of the flexible glass ribbon 12). In other examples, the separation path 32 could include a plurality of separation paths 32, for example by having the separation paths 32 extend generally parallel to each other at least partially along the length of the flexible glass ribbon 12. While the separation path 32 is shown to be generally linear, in further examples, the separation path 32 could be non-linear, and could include bends, curves, or the like.

The flexible ribbon configuration 10 further includes at least one ribbon extension extending between a first end and an opposing second end. The at least one ribbon extension can be attached to at least one of the trailing end 34 and the leading end 36 of the flexible glass ribbon 12. In one example, the at least one ribbon extension can include a leading ribbon extension 40 and a trailing ribbon extension 42. The at least one ribbon extension can be formed of a number of different materials, including plastic, metal, woven fiber, durable paper extension, etc. The at least one ribbon extension is depicted with a dashed line in FIGS. 1 and 5-12 to more clearly differentiate between the ribbon extension and the flexible glass ribbon 12 (depicted with a solid line). However, in operation, the at least one ribbon extension can form a solid structure similar to the flexible glass ribbon 12.

The leading ribbon extension 40 extends between a first end 44 and a second end 46. The leading ribbon extension 40 can include a number of different sizes and shapes. For example, with respect to the glass ribbon 12, the leading ribbon extension 40 could be longer or shorter in length, and/or could be wider or narrower in width, and/or could be thicker or thinner in thinness. The first end 44 of the leading ribbon extension 40 can be attached to the leading end 36 of the flexible glass ribbon 12. The first end 44 can be attached to the leading end 36 in any number of ways. In some examples, a fastener can be used to attach the first end 44 to the leading end 36. The fastener can include, for example, tapes, adhesives, epoxies, electrostatic pinning, etc. By attaching the first end 44 and leading end 36, the leading ribbon extension 40 and flexible glass ribbon 12 may or may not contact each other. For example, the first end 44 and leading end 36 can be attached such that the first end 44 and leading end 36 are substantially end to end and in contact with each other. In another example, the first end 44 and leading end 36 could at least partially overlap each other. In yet another example, the first end 44 and leading end 36 could be attached to each other but spaced apart, such that the first end 44 and leading end 36 do not contact each other.

The leading ribbon extension 40 can be attached to the downstream storage rolls 16, 18 at the second end 46. The leading ribbon extension 40 can be attached to the downstream storage rolls 16, 18 in any number of ways. In one example, a fastener can be used to attach portions of the leading ribbon extension 40 to one of the downstream storage rolls 16, 18. The fastener can include, for example, tapes, adhesives, epoxies, electrostatic pinning, etc.

The trailing ribbon extension 42 extends between a first end 48 and a second end 50. The trailing ribbon extension 42 can include a number of different sizes and shapes. For example, with respect to the glass ribbon 12, the trailing ribbon extension 42 could be longer or shorter in length, and/or could be wider or narrower in width, and/or could be thicker or thinner in thinness. The first end 48 of the trailing ribbon extension 42 can be attached to the trailing end 34 of the flexible glass ribbon 12. The first end 48 can be attached to the trailing end 34 in any number of ways. In some examples, a fastener can be used to attach the first end 48 to the trailing end 34. The fastener can include, for example, tapes, adhesives, epoxies, electrostatic pinning, etc. By attaching the first end 48 and trailing end 34, the trailing ribbon extension 42 and flexible glass ribbon 12 may or may not contact each other. For example, the first end 48 and trailing end 34 can be attached such that the first end 48 and trailing end 34 are substantially end to end and in contact with each other. In another example, the first end 48 and trailing end 34 could at least partially overlap each other. In yet another example, the first end 48 and trailing end 34 could be attached to each other but spaced apart, such that the first end 48 and trailing end 34 do not contact each other.

The trailing ribbon extension 42 can be attached to the upstream storage roll 14 at the second end 50. The trailing ribbon extension 42 can be attached to the upstream storage roll 14 in any number of ways. In one example, a fastener can be used to attach the trailing ribbon extension 42 to the upstream storage roll 14. The fastener can include, for example, tapes, adhesives, epoxies, electrostatic pinning, etc.

The at least one ribbon extension defines an elongated opening between the first end 44, 48 of the ribbon extension and the second end 46, 50 of the ribbon extension. In particular, the elongated opening in the at least one ribbon extension extends at least partially along a length of the ribbon extension between the first end and the second end of the ribbon extension. For example, the leading ribbon extension 40 includes an elongated opening 52 extending at least partially along the length of the leading ribbon extension 40. In one example, as shown in FIG. 2, the elongated opening 52 can extend along the entire length (i.e., from the first end 44 to the second end 46) of the leading ribbon extension 40. However, in further examples, the elongated opening 52 could extend a shorter distance. For example, the elongated opening 52 could extend from the first end 44 towards the second end 46, but can stop before reaching the second end 46. Likewise, the elongated opening 52 could extend from the second end 46 to the first end 44 while stopping before reaching the first end 44. As such, at least a portion of the length of the leading ribbon extension 40 (i.e., in proximity to the second end 46) may not include the elongated opening 52. In a further example, the elongated opening 52 may not be continuous, but, instead, can comprise a non-continuous elongated opening, for example by forming a series of perforations.

The elongated opening 52 can separate the leading ribbon extension 40 into one or more separate leading ribbon extensions. For example, the elongated opening 52 in FIG. 2 can separate the leading ribbon extension 40 into a first leading ribbon extension 54 and a second leading ribbon extension 56. The first leading ribbon extension 54 and second leading ribbon extension 56 can extend generally parallel to each other in a side by side formation. The first leading ribbon extension 54 and second leading ribbon extension 56 can be attached to the same downstream storage roll (shown in FIGS. 2 to 4) or, in further examples, to separate downstream storage rolls (shown in FIGS. 1 and 5-12). In one example (as shown in FIG. 1), the first leading ribbon extension 54 is attached to the first separated glass ribbon portion 22 at the first end 44 and to the first downstream storage roll 16 at the second end 46. The second leading ribbon extension 56 is attached to the second separated glass ribbon portion 24 at the first end 44 and to the second downstream storage roll 18 at the second end 46. In further examples, the elongated opening 52 can include one or more elongated openings 52. In such an example, the leading ribbon extension 40 is not limited to the two leading ribbon extensions (e.g., first leading ribbon extension 54 and second leading ribbon extension 56) but, rather, could include a plurality of leading ribbon extensions.

While the elongated opening 52 is shown to be positioned substantially at a midpoint of the width of the leading ribbon extension 40 to match the location of the separation path 32. However, depending on the location of the separation path 32 (or separation paths), the elongated opening 52 could be offset from the midpoint, for example being positioned closer to one of the edges of the leading ribbon extension 40. In further examples, the elongated opening 52 could comprise two elongated openings, with one elongated opening being positioned in proximity to one edge of the leading ribbon extension 40 and the other elongated opening being positioned in proximity to the opposite edge of the leading ribbon extension 40.

The trailing ribbon extension 42 includes an elongated opening 58 extending at least partially along the length of the trailing ribbon extension 42. In one example, as shown in FIG. 2, the elongated opening 58 can extend along the entire length (i.e., from the first end 48 to the second end 50) of the trailing ribbon extension 42. However, in further examples, the elongated opening 58 could extend a shorter distance. In one example, the elongated opening 58 could extend from the first end 48 towards the second end 50, but can stop before reaching the second end 50. Likewise, the elongated opening 58 could extend from the second end 50 to the first end 48 while stopping before reaching the first end 48. As such, at least a portion of the length of the trailing ribbon extension 42 (i.e., in proximity to the second end 50) may not include the elongated opening 58. In a further example, the elongated opening 58 may not be continuous, but, instead, can comprise a non-continuous elongated opening, for example by forming a series of perforations The elongated opening 58 can separate the trailing ribbon extension 42 into one or more separate trailing ribbon extensions. For example, the elongated opening 58 in FIG. 2 can separate the trailing ribbon extension 42 into a first trailing ribbon extension 60 and a second trailing ribbon extension 62. The first trailing ribbon extension 60 and second trailing ribbon extension 62 can extend generally parallel to each other in a side by side formation. The first trailing ribbon extension 60 and second trailing ribbon extension 62 can be attached to the upstream storage roll 14 or, in further examples, to separate upstream storage rolls. In still further examples, the elongated opening 58 can include one or more elongated openings 58. In such an example, the trailing ribbon extension 42 is not limited to the two trailing ribbon extensions (e.g., first trailing ribbon extension 60 and second trailing ribbon extension 62) but, rather, could include a plurality of trailing ribbon extensions.

The elongated opening 58 can be positioned substantially at a midpoint of the width of the trailing ribbon extension 42 to match the location of the separation path 32. However, depending on the location of the separation path 32 (or separation paths), the elongated opening 58 could be offset from the midpoint, for example being positioned closer to one of the edges of the trailing ribbon extension 42. In further examples, the elongated opening 58 could comprise two elongated openings, with one elongated opening being positioned in proximity to one edge of the trailing ribbon extension 42 and the other elongated opening being positioned in proximity to the opposite edge of the trailing ribbon extension 42.

The elongated openings 52, 58 can be formed in the leading ribbon extension 40 and trailing ribbon extension 42 in any number of ways. In one example, the elongated openings 52, 58 can be pre-formed in the leading ribbon extension 40 and trailing ribbon extension 42 prior to attaching the leading ribbon extension 40 and trailing ribbon extension 42 to the flexible glass ribbon 12. In another example, the openings 52, 58 could be formed after the leading ribbon extension 40 and trailing ribbon extension 42 are attached to the flexible glass ribbon 12. In either example, the elongated openings 52, 58 can be formed by a laser slitter, mechanical slitter, or the like.

Turning now to FIG. 3, a second example of the at least one ribbon extension for use in the flexible ribbon configuration 10 is shown. In this example, the flexible glass ribbon 12, upstream storage roll 14, and downstream storage rolls 16, 18 can be similar or identical to the structures shown and described with respect to FIG. 2.

The flexible ribbon configuration 10 can include a leading ribbon extension 140 attached to the leading end 36 of the flexible glass ribbon 12. The leading ribbon extension 140 can include one or more separate leading ribbon extensions. For example, the leading ribbon extension 140 can include a first leading ribbon extension 154 and a second leading ribbon extension 156. The first leading ribbon extension 154 and second leading ribbon extension 156 can have substantially the same dimensions (e.g., length, width, thickness), though in further examples, the first leading ribbon extension 154 and second leading ribbon extension 156 could have different dimensions, for example a differing width. The first leading ribbon extension 154 and second leading ribbon extension 156 can extend generally parallel to each other in a side by side formation.

The first leading ribbon extension 154 and second leading ribbon extension 156 can be spaced a distance apart from each other, such that the leading ribbon extensions may not contact each other. For example, an elongated opening 152 can be provided to extend in a direction that is generally parallel and between the first leading ribbon extension 154 and second leading ribbon extension 156. As such, the at least one ribbon extension includes the first leading ribbon extension 154 and second leading ribbon extension 156 that are separated from one another by the elongated opening 152. In one example, the elongated opening 152 can extend completely along the length of the first and second leading ribbon extensions 154, 156 such that the first leading ribbon extension 154 and second leading ribbon extension 156 do not contact each other. In another example, the elongated opening 152 could extend partially along the length of the first and second leading ribbon extensions 154, 156, such that the first leading ribbon extension 154 and second leading ribbon extension 156 may be attached to each other.

The flexible ribbon configuration 10 can further include a trailing ribbon extension 142 attached to the trailing end 34 of the flexible glass ribbon 12. The trailing ribbon extension 142 can include one or more separate trailing ribbon extensions. For example, the trailing ribbon extension 142 can include a first trailing ribbon extension 160 and a second trailing ribbon extension 162. The first trailing ribbon extension 160 and second trailing ribbon extension 162 can have substantially the same dimensions (e.g., length, width, thickness), though in further examples, the first trailing ribbon extension 160 and second trailing ribbon extension 162 could have different dimensions, for example a differing width. The first trailing ribbon extension 160 and second trailing ribbon extension 162 can extend generally parallel to each other in a side by side formation.

The first trailing ribbon extension 160 and second trailing ribbon extension 162 can be spaced a distance apart from each other, such that the trailing ribbon extensions may not contact each other. For example, an elongated opening 158 can be provided to extend in a direction that is generally parallel to and between the first trailing ribbon extension 160 and second trailing ribbon extension 162. As such, the at least one ribbon extension includes the first trailing ribbon extension 160 and second trailing ribbon extension 162 that are separated from one another by the elongated opening 158. In one example, the elongated opening 158 can extend completely along the length of the first and second trailing ribbon extensions 160, 162 such that the first trailing ribbon extension 160 and second trailing ribbon extension 162 do not contact each other. In another example, the elongated opening 158 could extend partially along the length of the first and second trailing ribbon extensions 160, 162, such that the first trailing ribbon extension 160 and second trailing ribbon extension 162 may be attached to each other.

In either or both of the leading ribbon extension 140 and trailing ribbon extension 142, the elongated openings 152, 158 can be provided to substantially match the location of the separation path 32. Accordingly, during the cutting of the flexible glass ribbon 12 by the cutting location 28 along the separation path 32, debris from the leading and/or trailing ribbon extensions can be reduced. Further, cutting of the leading ribbon extension 140 and trailing ribbon extension 142 by the cutting location 28 can likewise be reduced.

Turning now to FIG. 4, a third example of the at least one ribbon extension for use in the flexible ribbon configuration 10 is shown. In this example, the flexible glass ribbon 12, upstream storage roll 14, and downstream storage rolls 16, 18 can be similar or identical to the structures shown and described with respect to FIG. 2.

The flexible ribbon configuration 10 can include the leading ribbon extension 40 attached to the leading end 36 of the flexible glass ribbon 12. The leading ribbon extension 40 can be identical in structure to the leading ribbon extension 40 described above with respect to FIG. 2. In the alternative, the flexible ribbon configuration 10 could be provided with the leading ribbon extension 140 described above with respect to FIG. 3.

The flexible ribbon configuration 10 can include a trailing ribbon extension 242 attached to the trailing end 34 of the flexible glass ribbon 12. In this example, the trailing ribbon extension 242 may not be provided with an elongated opening. Rather, the trailing ribbon extension 242 can be a generally solid ribbon extension extending between the first end 48 and second end 50. As will be described in more detail below, the trailing ribbon extension 242 can be provided with an opening after the flexible glass ribbon 12 has been cut.

A method of making a flexible ribbon configuration and a method of separating a flexible ribbon configuration will now be described with reference to FIGS. 1 to 12. Similar or identical method steps may be formed with further examples, for instance, as described throughout the application. Moreover, example methods of the present disclosure may omit and/or add additional steps. Unless noted, the steps can be performed simultaneously, sequentially, or in different orders depending on the particular application.

Referring first to FIGS. 2-4, the method of making the flexible ribbon configuration 10 includes the step of providing the flexible glass ribbon 12 including the leading end 36 and the trailing end 34. In one example, the step of providing the flexible glass ribbon 12 includes obtaining the flexible glass ribbon 12 from a manufacturer. In another example, the step of providing the flexible glass ribbon 12 includes manufacturing the flexible glass ribbon 12, for example through an overflow downdraw method or other glass making techniques.

The method of making the flexible ribbon configuration 10 further includes the step of attaching the first end 44, 48 of the at least one ribbon extension (e.g., leading ribbon extension 40, 140 or trailing ribbon extension 42, 142, 242) to at least one of the leading end 36 and the trailing end 34 of the flexible glass ribbon 12. In particular, the first end 44 of the leading ribbon extension 40, 140 can be attached to the leading end 36 of the flexible glass ribbon 12. The first end 48 of the trailing ribbon extension 42, 142, 242 can be attached to the trailing end 34 of the flexible glass ribbon 12.

As shown in FIGS. 2 and 3, during this step of attaching, the at least one ribbon extension (e.g., leading ribbon extension 40, 140 or trailing ribbon extension 42, 142, 242) defines the elongated opening 52, 58, 152, 158 extending between the first end 44, 48 of the ribbon extension (e.g., leading ribbon extension 40, 140 or trailing ribbon extension 42, 142, 242) and the opposing second end 46, 50. In particular, the at least one ribbon extension includes the leading ribbon extension 40, 140 and trailing ribbon extension 42, 142, 242. During this step of attaching, the method of making the flexible ribbon configuration 10 further includes the step of attaching the first end 44 of the leading ribbon extension 40, 140 to the leading end 36 of the flexible glass ribbon 12. The method also includes the step of attaching the first end 48 of the trailing ribbon extension 42, 142, 242 to the trailing end 34 of the flexible glass ribbon 12. As set forth above, the step of attaching can be accomplished in any number of ways, for example with a fastener (e.g., tapes, adhesives, epoxies, etc.). Likewise, as set forth above, the step of attaching can include an end to end attachment with the ends in contact, an end to end attachment with the ends not being in contact (e.g., a space or gap between the ends), or a partially overlapping attachment.

The method of making the flexible ribbon configuration 10 can further include the step of attaching the second end 50 of the trailing ribbon extension 42, 142, 242 to the upstream storage roll 14. For example, as shown in FIGS. 2 to 4, the second end 50 can be attached in any number of ways to the upstream storage roll 14. The second end 50 can be attached with a fastener (e.g., tapes, adhesives, epoxies, electrostatic pinning, etc.).

Figure 5:
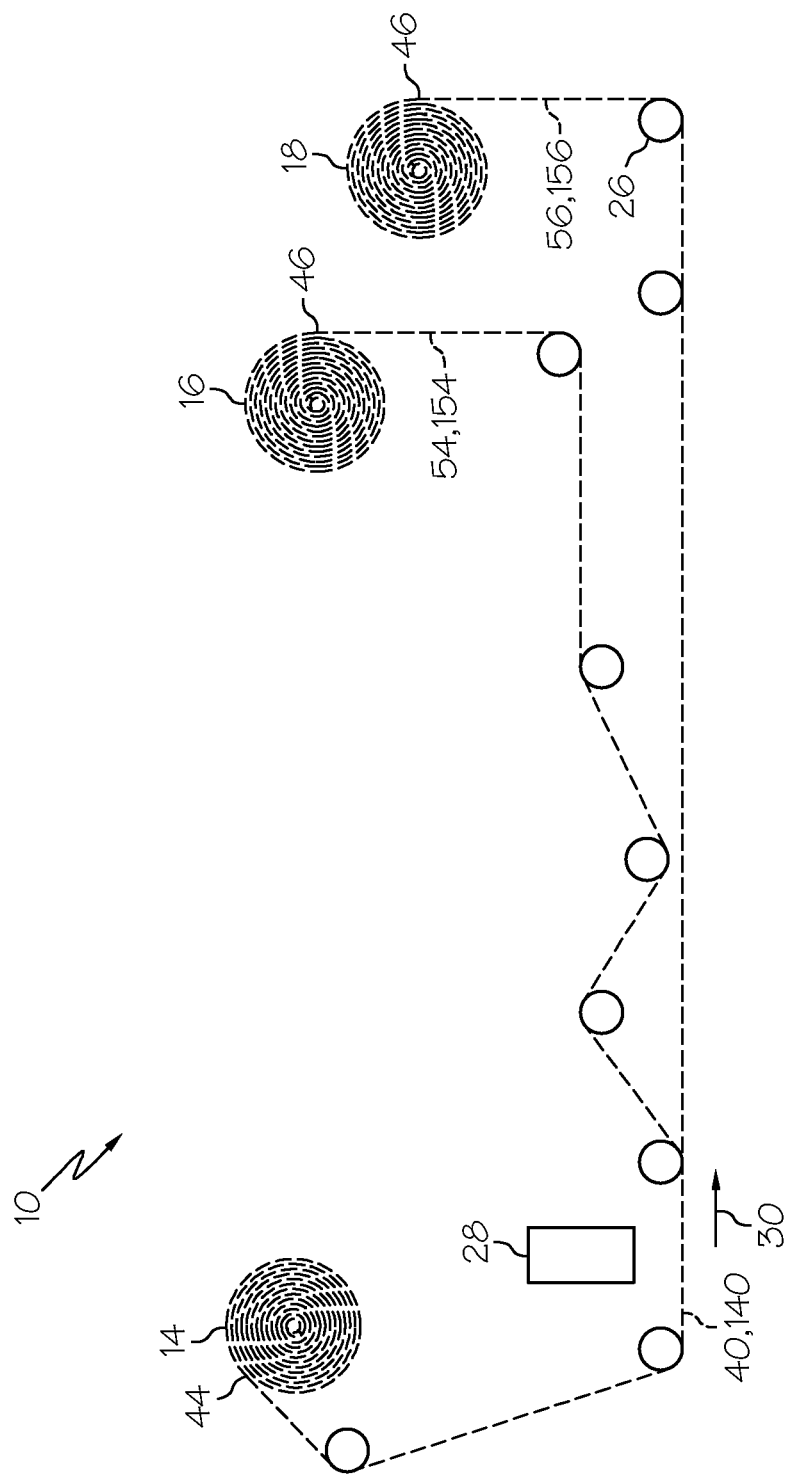
FIG. 5 is a perspective view of the example flexible ribbon configuration with the flexible glass ribbon wound onto an upstream storage roll.

The method further includes the step of attaching the second end 46 of the leading ribbon extension 40, 140 to the downstream storage roll 16, 18. In one example, the leading ribbon extension 40, 140 includes a plurality of leading ribbon extensions. In particular, the leading ribbon extension 40, 140 can include the first leading ribbon extension 54, 154 and the second leading ribbon extension 56, 156. Referring briefly to FIG. 5, in such an example, the second end 46 of the first leading ribbon extension 54, 154 can be attached to the first downstream storage roll 16. The second end 46 of the second leading ribbon extension 56, 156 can be attached to the second downstream storage roll 18. The second ends 46 can be attached in any number of ways, for example with a fastener (e.g., tapes, adhesives, epoxies, etc.).

During the step of attaching, the elongated opening 52, 58, 152, 158 in the ribbon extension (e.g., leading ribbon extension 40, 140 or trailing ribbon extension 42, 142, 242) is provided to extend at least partially along the length of the ribbon extension between the first end 44, 48 and the second end 46, 50 of the ribbon extension. By extending at least partially along the length, the elongated opening 52, 58, 152, 158 could extend along the entire length of the ribbon extension (e.g., leading ribbon extension 40, 140 or trailing ribbon extension 42, 142, 242), or may extend less than the entire length. In one example, the elongated opening 52, 58, 152, 158 can be provided in the ribbon extensions (e.g., leading ribbon extension 40, 140 or trailing ribbon extension 42, 142, 242) prior to attaching the ribbon extensions to the flexible glass ribbon 12. In such an example, the ribbon extension (e.g., leading ribbon extension 40, 140 or trailing ribbon extension 42, 142, 242) can be cut by means of a laser slitter, mechanical slitter, or the like to provide the elongated opening 52, 58.

In another example, the elongated opening 152, 158 may not be provided by cutting. Rather, as shown in FIG. 3, the method of making the flexible ribbon configuration 10 can include the step of the at least one ribbon configuration including two ribbon extensions (e.g., first and second leading ribbon extensions 154, 156 and first and second trailing ribbon extensions 160, 162). The step further includes attaching the two ribbon extensions relative to one another to define the elongated opening 152, 158 between the two ribbon extensions. In such an example, the two ribbon extensions (e.g., first and second leading ribbon extensions 154, 156 and first and second trailing ribbon extensions 160, 162) extend generally parallel to each other in a side by side formation with elongated opening 152, 158 formed therebetween. As will be described in more detail below with respect to FIGS. 8 to 12, the elongated opening 52, 58 can be provided after the ribbon extension has been attached to the flexible glass ribbon 12 by cutting the ribbon extension with an example second cutting location 128.

Referring still to FIGS. 2-4, the method of separating the flexible ribbon configuration 10 will now be described. The method includes the step of providing the flexible glass ribbon 12 including the leading end 36 and the trailing end 34. The first end 44, 48 of the at least one ribbon extension (e.g., leading ribbon extension 40, 140 or trailing ribbon extension 42, 142, 242) is attached to at least one of the leading end 36 and the trailing end 34 of the flexible glass ribbon 12. For example, the first end 44 of the leading ribbon extension 40, 140 can be attached to the leading end 36 of the flexible glass ribbon 12. In another example, the first end 48 of the trailing ribbon extension 42, 142, 242 can be attached to the trailing end 34 of the flexible glass ribbon 12.

The method of separating the flexible ribbon configuration 10 further includes the step of providing the at least one ribbon extension (e.g., leading ribbon extension 40, 140 or trailing ribbon extension 42, 142, 242) with the elongated opening 52, 58, 152, 158. As described above, the elongated opening 52, 58, 152, 158 can be provided in any number of ways. For example, the elongated opening 52, 58, 152, 158 can be provided as a slit extending at least partially along the length of the ribbon extension. In other examples, the elongated opening 52, 58, 152, 158 could be provided by cutting the ribbon extension after the ribbon extension has been attached to the flexible glass ribbon 12 (described above with respect to FIGS. 8 to 12).

The method can further include the step of providing the at least one ribbon extension as two ribbon extensions (e.g., first and second leading ribbon extensions 154, 156 and first and second trailing ribbon extensions 160, 162) spaced apart from one another to provide the elongated opening 152, 158. In such an example, the two ribbon extensions can be attached relative to one another to define the elongated opening 152, 158 between the two ribbon extensions. The two ribbon extensions (e.g., first and second leading ribbon extensions 154, 156 and first and second trailing ribbon extensions 160, 162) can extend generally parallel to each other in a side by side formation with elongated opening 152, 158 formed therebetween.

The method can further include the step of providing the at least one ribbon extension (e.g., leading ribbon extension 40, 140 or trailing ribbon extension 42, 142, 242) with the elongated opening 52, 58, 152, 158 extending in a direction along the separation path 32. In particular, as shown in FIGS. 2 to 4, the separation path 32 defines a location at which the flexible glass ribbon 12 can be cut by the cutting location 28. The elongated opening 52, 58, 152, 158 can extend in the same direction as the separation path 32 and substantially match a location (across the width of the glass ribbon) of the separation path 32. By matching the location of the separation path 32, slitting debris from the ribbon extensions can be reduced during cutting of the flexible glass ribbon 12.

Turning now to FIG. 5, the flexible glass ribbon 12 can initially be wound on the upstream storage roll 14. The leading ribbon extension 40, 140 can be attached at the first end 44 to the flexible glass ribbon 12. With the flexible glass ribbon 12 initially wound on the upstream storage roll 14, the leading ribbon extension 40, 140 can extend along the travel path 30 between the upstream storage roll 14 and the downstream storage rolls 16, 18. In one example, the leading ribbon extension 40, 140 can have a length that is at least as long as the travel path from the upstream storage roll 14 and the downstream storage rolls 16, 18. In further examples, however, the leading ribbon extension 40, 140 could be longer or shorter than as shown. For instance, the leading ribbon extension 40, 140 could be longer in length, such that the leading ribbon extension can wind at least partially around either or both of the upstream storage roll 14 and the downstream storage rolls 16, 18. In the alternative, the leading ribbon extension 40, 140 could be shorter in length than as shown, such that the leading ribbon extension 40, 140 extends only partially along the travel path 30 between the upstream storage roll 14 and the downstream storage rolls 16, 18.

Figure 6:
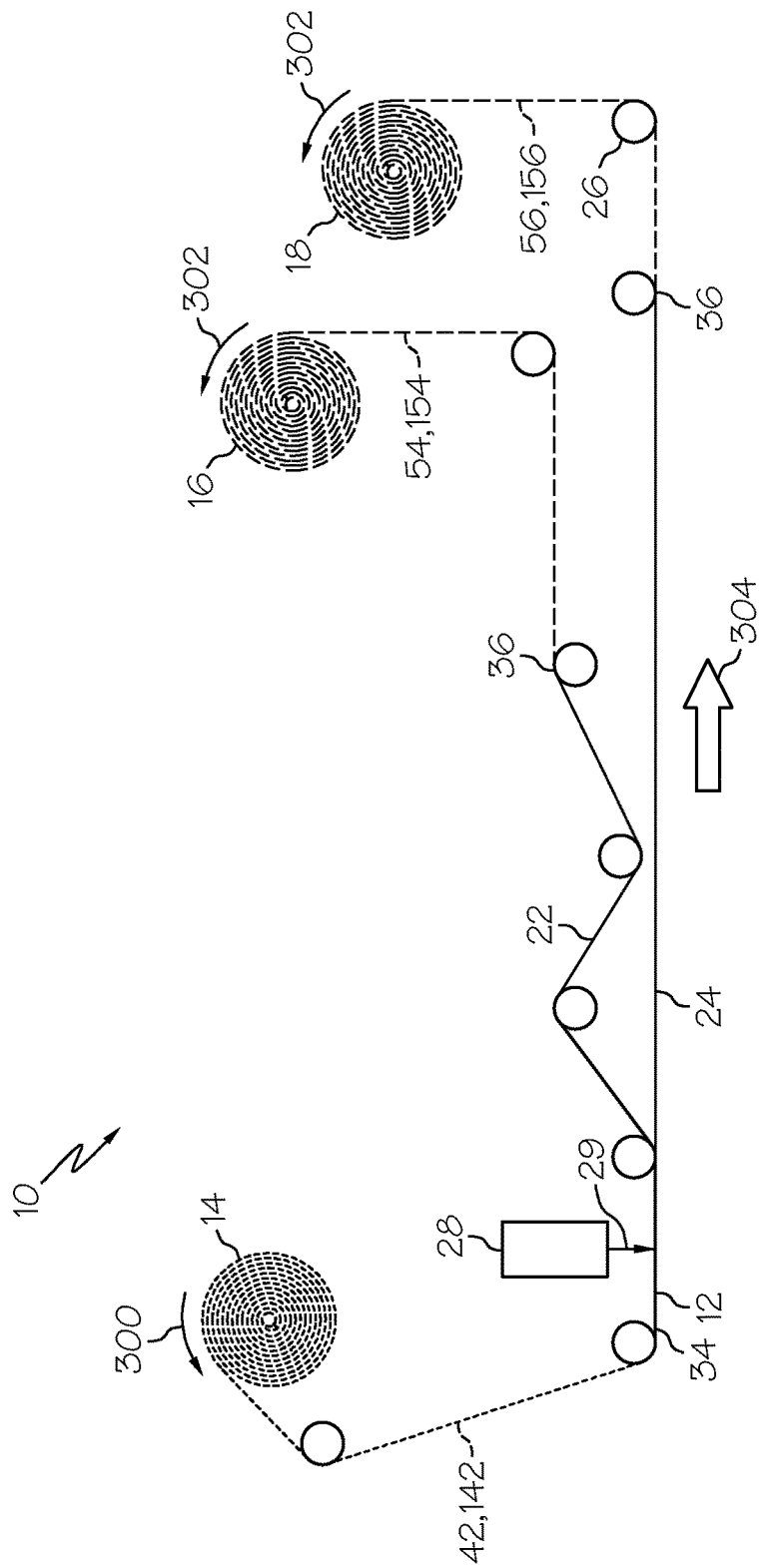
FIG. 6 is a perspective view of the example flexible ribbon configuration with the flexible glass ribbon moving through a cutting location.

Turning now to FIG. 6, the upstream storage roll 14 can be rotated in the unwinding direction 300 while the first and second downstream storage rolls 16, 18 can be rotated in the winding direction 302. While the unwinding direction 300 and winding direction 302 are depicted as being counterclockwise, in further examples, the unwinding direction 300 and winding direction 302 could be clockwise instead. As the upstream storage roll 14 and downstream storage rolls 16, 18 rotate, the flexible glass ribbon 12 can unwind from the upstream storage roll 14 and move in the first direction 304.

The flexible glass ribbon 12 can pass along the cutting location 28, whereupon the cutting location 28 can provide the cutting operation 29. In particular, the method can include the step of cutting the flexible glass ribbon 12 at the cutting location 28 along the separation path 32. In one example, the method includes the step of unwinding the flexible glass ribbon 12 from the upstream storage roll 14 during the step of cutting. As the flexible glass ribbon 12 is unwound from the upstream storage roll 14, the flexible glass ribbon 12 can move towards the cutting location 28. Cutting the flexible glass ribbon 12 along the separation path 32 can provide the first separated glass ribbon portion 22 provided with the first ribbon extension (e.g., first leading ribbon extension 54, 154) of the at least one ribbon extension. Further, cutting the flexible glass ribbon 12 along the separation path 32 can also provide the second separated glass ribbon portion 24 provided with the second ribbon extension (e.g., second leading ribbon extension 56, 156) of the at least one ribbon extension.

The method of separating the flexible ribbon configuration 10 can further include the step of maintaining a tension in a portion of the flexible glass ribbon 12 with the ribbon extension while moving the flexible glass ribbon 12 relative to the cutting location 28. In one example, the flexible glass ribbon 12 can be supported at the trailing end 34 by the trailing ribbon extension 42, 142 which is attached to the upstream storage roll 14. Likewise, the flexible glass ribbon 12 can be supported at the leading end 36 by the first leading ribbon extension 54, 154 and the second leading ribbon extension 56, 156. The first leading ribbon extension 54, 154 can be attached to the first downstream storage roll 16 while the second leading ribbon extension 56, 156 can be attached to the second downstream storage roll 18. Accordingly, the step of cutting the flexible glass ribbon 12 can be completed while the ribbon extension (e.g., trailing ribbon extension 42, 142 or leading ribbon extensions 54, 56, 154, 156) maintains the tension in the flexible glass ribbon 12. The glass ribbon 12 may be longer than the distance between the upstream storage roll 14 and the downstream storage rolls 16, 18, whereby the leading ribbon extension provides a manner of maintaining the tension in the glass ribbon 12 at the start of a cutting operation, i.e., one performed on the glass ribbon leading end 36, whereas the trailing ribbon extension provides a manner of maintaining the tension in the glass ribbon 12 at the end of a cutting operation, i.e., where the cutting operation is approaching the glass ribbon trailing end 34.

The method can further include the step of winding the first separated glass ribbon portion 22 on the first downstream storage roll 16 and winding the second separated glass ribbon portion 24 on the second downstream storage roll 18. In particular, the first and second downstream storage rolls 16, 18 can rotate in the winding direction 302. This rotation in the winding direction 302 can cause the first separated glass ribbon portion 22 to wind onto and wrap around the first downstream storage roll 16. Similarly, this rotation in the winding direction 302 can cause the second separated glass ribbon portion 24 to wind onto and wrap around the second downstream storage roll 18.

During the step of cutting the flexible glass ribbon 12, the method can further include the step of continuing to cut the flexible glass ribbon 12 after the trailing end 34 of the flexible glass ribbon 12 leaves the upstream storage roll 14. In particular, the flexible glass ribbon 12 can continue to move with respect to the cutting location 28 during the cutting operation 29, thus causing the flexible glass ribbon 12 to be cut into the first and second separated glass ribbon portions 22, 24. This cutting of the flexible glass ribbon 12 can still occur even after the trailing end 34 has unwound from the upstream storage roll 14. Accordingly, a length of the ribbon extension (e.g., trailing ribbon extension 42, 142) can span a distance along the travel path 30 between the upstream storage roll 14 and the cutting location 28. In particular, the trailing ribbon extension 42, 142 has a length that is at least as long as the distance along the travel path 30 from the upstream storage roll 14 to the cutting location 28, and preferably a length at least as long as the distance along the travel path from the upstream storage roll 14 to the downstream storage rolls 16, 18 so that the glass ribbon trailing end 34 may safely be wound onto the downstream storage rolls 16, 18 while still in tension to avoid damage thereto.

Figure 7:
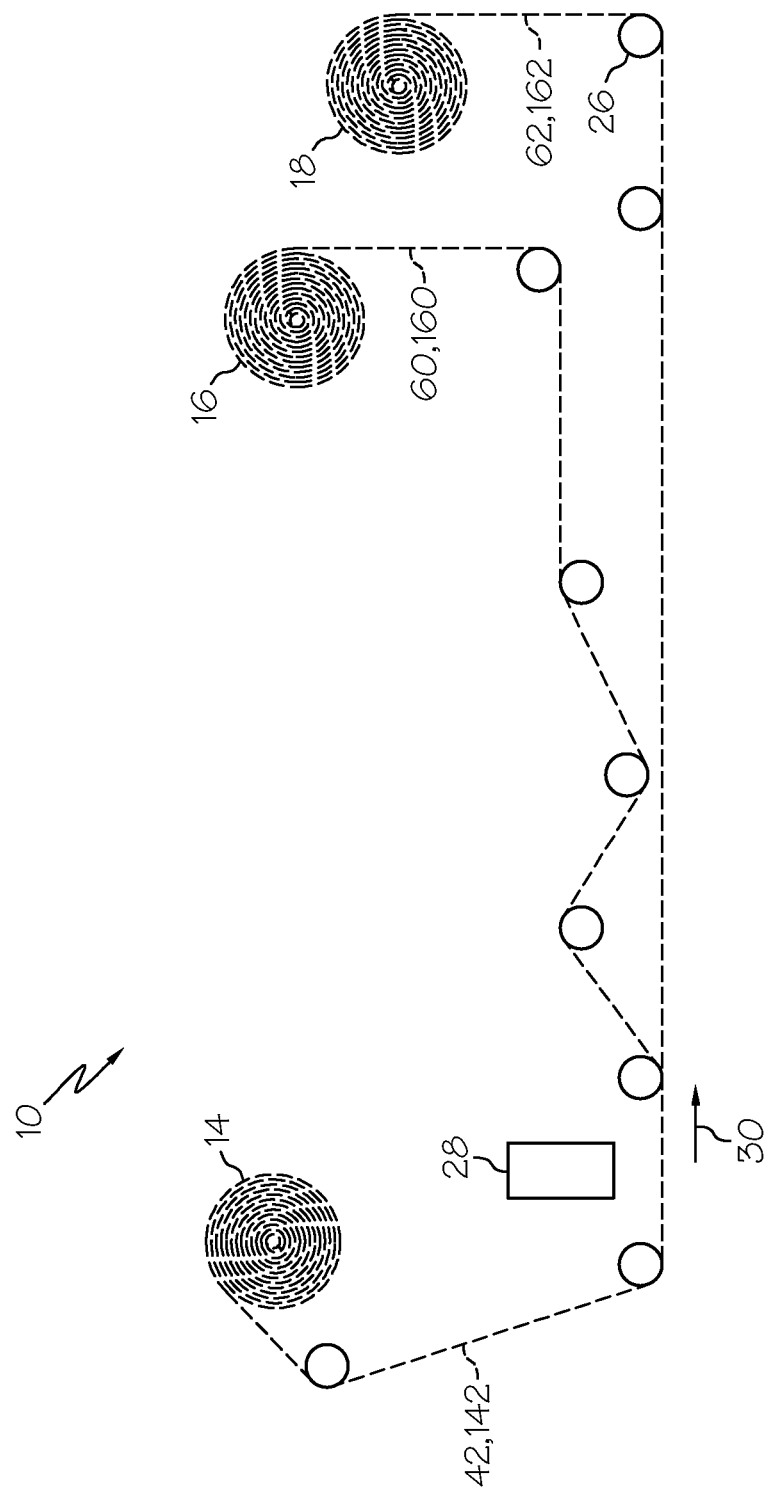
FIG. 7 is a perspective view of the example flexible ribbon configuration with the flexible glass ribbon wound onto at least one downstream storage roll.

Turning now to FIG. 7, after the flexible glass ribbon 12 has been cut, the first separated glass ribbon portion 22 can be wound onto the first downstream storage roll 16. Likewise, the second separated glass ribbon portion 24 can be wound onto the second downstream storage roll 18. The trailing ribbon extension 42, 142, including the first trailing ribbon extension 60, 160 and second trailing ribbon extension 62, 162, can have a length that is at least as long as the distance along the travel path 30 between the upstream storage roll 14 and the first and second downstream storage roll 16, 18. As such, in one example, the trailing ribbon extension 42, 142, including the first trailing ribbon extension 60, 160 and second trailing ribbon extension 62, 162, can extend completely from the upstream storage roll 14 to the first and second downstream storage roll 16, 18. By providing the trailing ribbon extension 42, 142 with at least this length, the flexible glass ribbon 12 can be supported and maintained in tension at least until the first and second separated glass ribbon portions 22, 24 have been wound onto the first and second downstream storage roll 16, 18, respectively.

Figure 8:
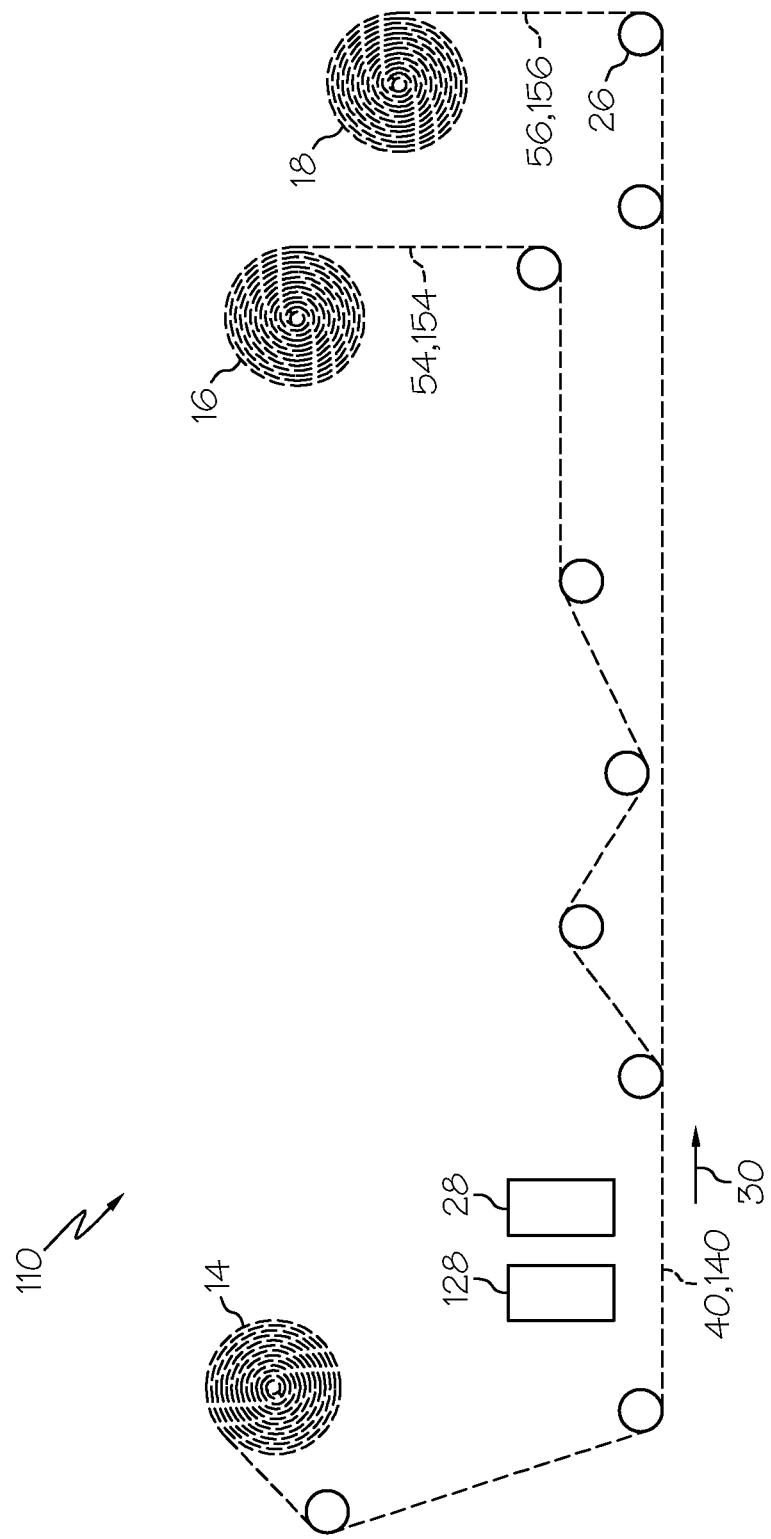
FIG. 8 is a perspective view of a second example flexible ribbon configuration with the flexible glass ribbon wound onto an upstream storage roll.

Turning now to FIG. 8, a second example flexible ribbon configuration 110 is shown. In this example, the flexible glass ribbon 12 is initially wound on the upstream storage roll 14. The trailing ribbon extension 242 shown in FIG. 4 can be provided in attachment with the upstream storage roll 14 and the flexible glass ribbon 12. The trailing ribbon extension 242 may not initially have an elongated opening.

In this initial position, the leading ribbon extension 40, 140 can extend from the flexible glass ribbon 12 at the upstream storage roll 14 to the first and second downstream storage rolls 16, 18.

Figure 9:
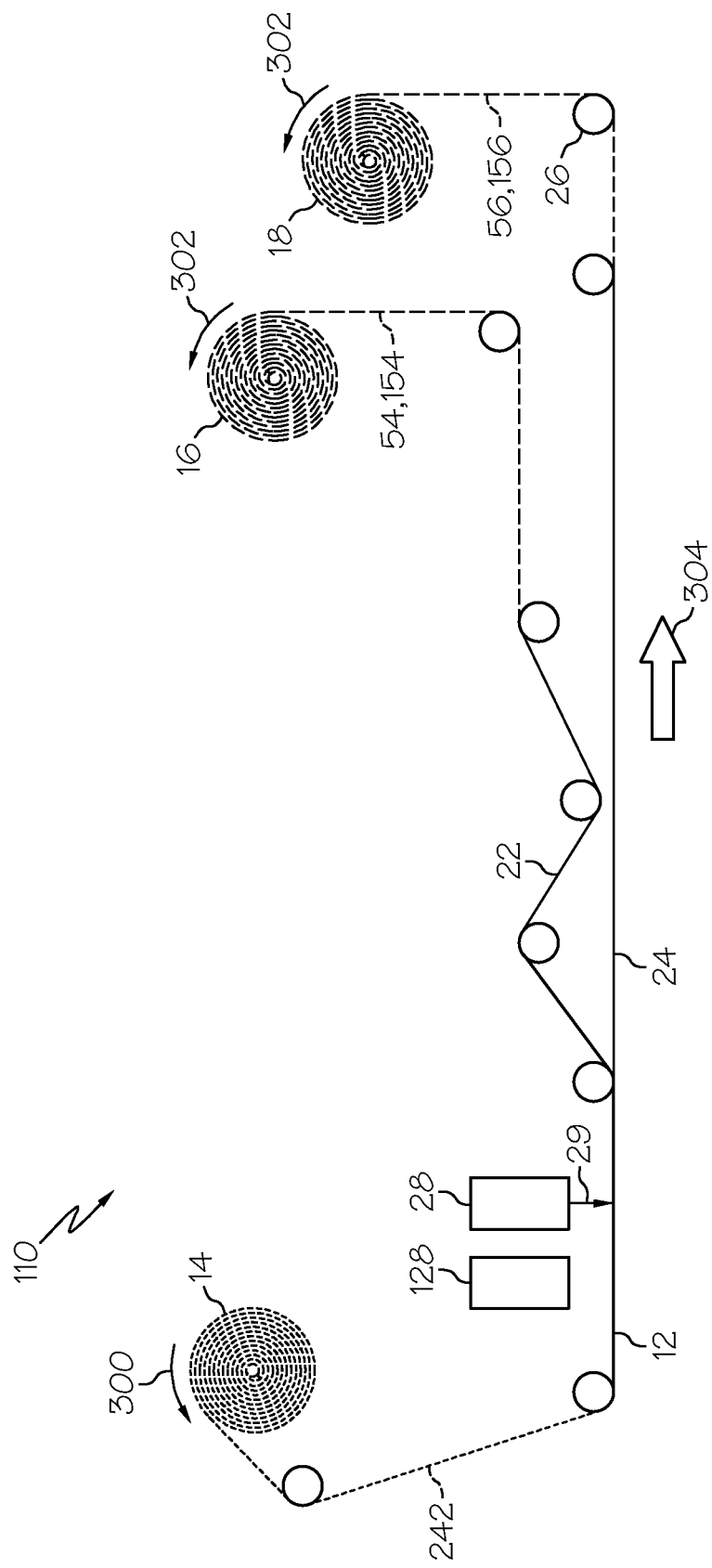
FIG. 9 is a perspective view of the second example flexible ribbon configuration with the flexible glass ribbon moving through the cutting location.

Turning to FIG. 9, the upstream storage roll 14 can be rotated in an unwinding direction 300 while the first and second downstream storage rolls 16, 18 can be rotated in a winding direction 302. As the upstream storage roll 14 and downstream storage rolls 16, 18 rotate, the flexible glass ribbon 12 can unwind from the upstream storage roll 14 and move in a first direction 304. The flexible glass ribbon 12 can pass along the cutting location 28, whereupon the cutting location 28 can provide a cutting operation 29 (shown somewhat generically/schematically with arrowhead). As the cutting operation 29 is performed, the flexible glass ribbon 12 can be cut. In particular, the flexible glass ribbon 12 can be cut along the length of the flexible glass ribbon 12 to provide the first separated glass ribbon portion 22 and second separated glass ribbon portion 24. The first separated glass ribbon portion 22 can be wound on the first downstream storage roll 16 while the second separated glass ribbon portion 24 can be wound on the second downstream storage roll 18 as the downstream storage rolls 16, 18 continue to move in the winding direction 302.

Figure 10:
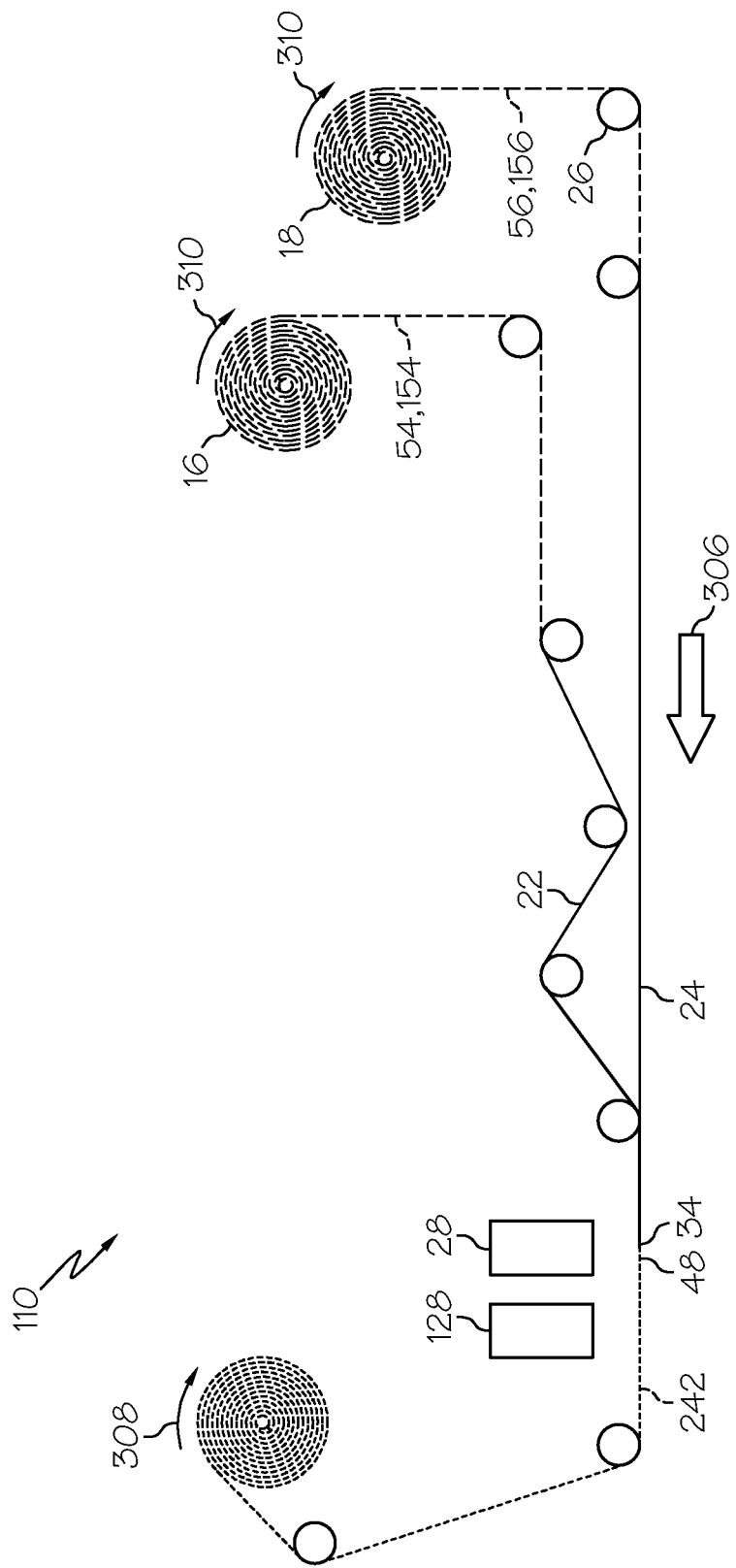
FIG. 10 is a perspective view of the second example flexible ribbon configuration with the flexible glass ribbon having moved through the cutting location.

Turning to FIG. 10, the flexible glass ribbon 12 can continue to move in the first direction 304 until the trailing end 34 of the flexible glass ribbon 12 reaches the cutting location 28. At that point, the cutting operation 29 can be stopped, as the first end 48 of the trailing ribbon extension 242 has reached the cutting location 28. Accordingly, in the method of separating the flexible ribbon configuration 10, the step of cutting the flexible glass ribbon 12 can begin prior to completing the step of providing the at least one ribbon extension with the elongated opening.

To provide the at least one ribbon extension with the elongated opening, the flexible glass ribbon 12 can be moved in a second direction 306 that is opposite the first direction 304. In particular, the upstream storage roll 14 is rotated in a winding direction 308 that is opposite the unwinding direction 300 while the first and second downstream storage rolls 16, 18 can be rotated in an unwinding direction 310 that is opposite the winding direction 302. The flexible glass ribbon 12 can be moved in this second direction 306 at least until the first end 48 has reached the second cutting location 128.

The second cutting location 128 can be different than the cutting location 28. For example, the cutting location 28 can be designed to cut the flexible glass ribbon 12. The second cutting location 128 can be designed to cut the material forming the trailing ribbon extension 242. While the cutting location 28 and second cutting location 128 are shown as two separate structures, in further examples, the cutting location 28 and second cutting location 128 could comprise a single structure, a single housing, and/or separate structures housed in a single housing. Further, while the second cutting location 128 is shown to be positioned upstream from the cutting location 28 (i.e., closer to the upstream storage roll 14), in further examples, the cutting location 28 and second cutting location 128 are not limited to such a location. Rather, the cutting location 28 could be provided upstream from the second cutting location 128. Similarly, the cutting location 28 and second cutting location 128 could be closer together or further apart than as shown.

Figure 11:
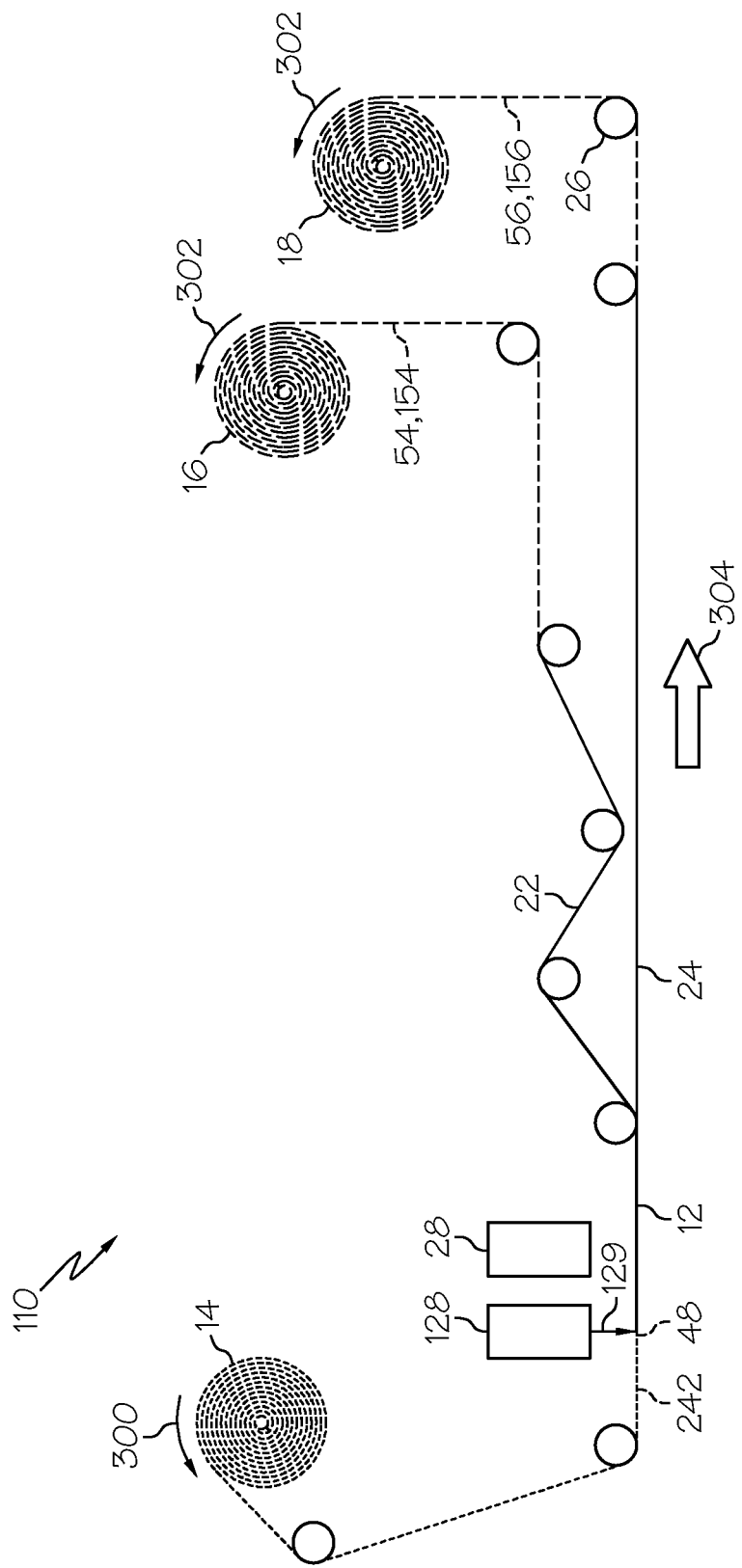
FIG. 11 is a perspective view of the second example flexible ribbon configuration with a ribbon extension moving through a second cutting location.

Turning to FIG. 11, once the first end 48 of the trailing ribbon extension 242 has reached the second cutting location 128, the movement in the second direction 306 can be stopped. At that point, the second cutting location 128 can initiate a second cutting operation 129 (shown somewhat generically/schematically with arrowhead). As this second cutting operation 129 is performed, the trailing ribbon extension 242 and flexible glass ribbon 12 can resume moving in the first direction 304. By moving the trailing ribbon extension 242 through the second cutting location 128, the trailing ribbon extension 242 can be cut so as to form an elongated opening extending at least partially along a length of the trailing ribbon extension 242.

Turning to FIG. 12, cutting the trailing ribbon extension 242 can form a first trailing ribbon extension 260 and a second trailing ribbon extension 262. The first end of the first trailing ribbon extension 260 and second trailing ribbon extension 262 can extend to the first downstream storage roll 16 and second downstream storage roll 18. In the shown example, the trailing ribbon extension 242 can have a length that is at least as long as the travel path 30 from the upstream storage roll 14 to the first and second downstream storage rolls 16, 18.

Providing the flexible glass ribbon 12 with the ribbon extensions can allow for a tension to be maintained as the flexible glass ribbon 12 moves through the cutting location 28 and is cut. Further, by providing the elongated openings in the ribbon extensions, debris from cutting of the flexible glass ribbon 12 along the separation line 32 can be reduced.

The disclosure has been described with reference to the example embodiments described above. Modifications and alterations will occur to others upon a reading and understanding of this specification. Examples embodiments incorporating one or more aspects of the disclosure are intended to include all such modifications and alterations insofar as they come within the scope of the appended claims.

What is claimed is:

1. A flexible ribbon configuration comprising:
a flexible glass ribbon including a first end, a second end, a length extending between the first end and the second end, and a separation path extending along the length of the flexible glass ribbon, wherein the flexible glass ribbon is not separated along the separation path; and
a first ribbon extension including a first end attached to the first end of the flexible glass ribbon, a second end spaced a distance away from the first end of the flexible glass ribbon without contacting the flexible glass ribbon, the first ribbon extension including a length extending between the first end of the first ribbon extension and the second end of the first ribbon extension, the first ribbon extension being separated at least partially along a path of the first ribbon extension that extends along the length of the first ribbon extension, and the path of the first ribbon extension is aligned with the separation path of the flexible glass ribbon at the first end of the flexible glass ribbon.

2. A flexible ribbon configuration comprising:
a flexible glass ribbon including a leading end, a trailing end, a length extending between the leading end and the trailing end, and a separation path extending along the length of the flexible glass ribbon, wherein the flexible glass ribbon is not separated along the separation path;
a leading ribbon extension including a trailing end attached to the leading end of the flexible glass ribbon, and a leading end spaced away from the leading end of the flexible glass ribbon without contacting the flexible glass ribbon, the leading ribbon extension including a length extending between the leading end of the leading ribbon extension and the trailing end of the leading ribbon extension, the leading ribbon extension being separated at least partially along a path of the leading ribbon extension that extends along the length of the leading ribbon extension, and the path of the leading ribbon extension is aligned with the separation path of the flexible glass ribbon at the leading end of the flexible glass ribbon; and a trailing ribbon extension including a leading end attached to the trailing end of the flexible glass ribbon, a trailing end spaced away from the trailing end of the flexible glass ribbon without contacting the flexible glass ribbon, and a length extending between the leading end of the trailing ribbon extension and the trailing end of the trailing ribbon extension, wherein the trailing ribbon extension is separated at least partially along a path of the trailing ribbon extension that extends along the length of the trailing ribbon extension, and the path of the trailing ribbon extension is aligned with the separation path of the flexible glass ribbon at the trailing end of the flexible glass ribbon.

* * * * *